No. 670,412. Patented Mar. 19, 1901.
P. W. TILLINGHAST.
PNEUMATIC TIRE.
(Application filed Aug. 14, 1899.)

(No Model.)

Witnesses.
J. L. Burdick
R. J. Phillips.

Inventor.
Pardon W. Tillinghast

THE NORRIS PETERS CO., PHOTO-LITHO., WASHINGTON, D. C.

UNITED STATES PATENT OFFICE.

PARDON W. TILLINGHAST, OF EDGEWOOD, RHODE ISLAND.

PNEUMATIC TIRE.

SPECIFICATION forming part of Letters Patent No. 670,412, dated March 19, 1901.

Application filed August 14, 1899. Serial No. 727,130. (No specimens.)

*To all whom it may concern:*

Be it known that I, PARDON WILBUR TILLINGHAST, a citizen of the United States, residing at Edgewood, in the town of Cranston and State of Rhode Island, have invented certain new and useful Improvements in Pneumatic Tires, of which the following is a specification.

My invention is applicable to the manufacture of all pneumatic tires; but it relates more particularly to the large-section automobile-tires, which are called upon to support a considerable weight, in some cases over one thousand pounds to each tire. In pneumatic tires of this class as heretofore constructed the hard service to which they are subjected soon separates the outer layer of rubber on the tread from the underlying tire fabric, as vulcanization will not sufficiently unite the ordinary rubber and fabric to withstand the severe driving and flexing strains of these tires while under the contained-air pressure.

It is the object of my invention to supply a means of thoroughly uniting the rubber and fabric in a tire, and I accomplish the desired end by increasing the contacting surface of the fabric and rubber, so that it is impossible to separate them without accomplishing their destruction, and I am enabled to use a lighter construction of tire at the tread or wearing-surface.

Figure 1:
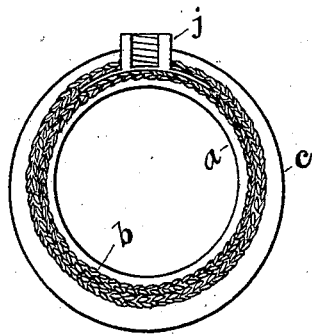
Figure 2:
Figure 3:
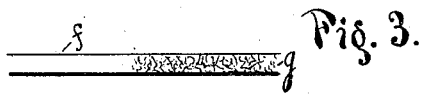
Figure 4:
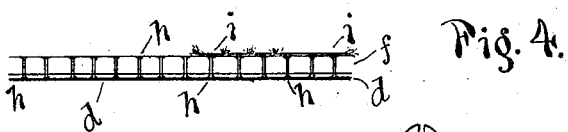
Figure 5:
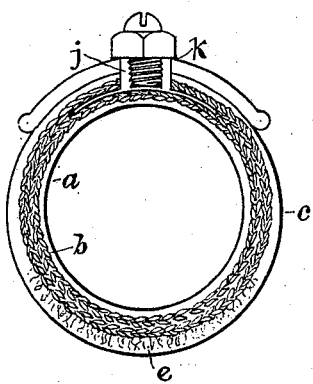

In the accompanying drawings, Figure 1 represents the ordinary carriage or automobile tire. Fig. 2 shows a fabric having threads or fibers extending from one surface. Fig. 3 is an edge view of sheet-rubber. Fig. 4 is an edge view of sheet-rubber, showing it stitched to a fabric. Fig. 5 illustrates a pneumatic tire embodying my invention.

In Fig. 1 of the accompanying drawings, *a* is the air-tube, *b* the fabric, and *c* the outer rubber, of the ordinary carriage or automobile pneumatic tire. Fabrics for tires of this class are usually of heavy woven or braided material, and although such material presents a more or less regular series of raised thread portions and intermediate depressions the attaching-surface presented for union with the rubber is little in excess of a flat surface. The same may be said of a wound fabric, the surface of which is equal to about one-half of the circumference of the parallel threads composing it.

In my construction I increase the holding or contact surface of the fabric beyond the point attained by the use of the ordinary woven, braided, or wound fabrics.

In Fig. 2, *d* represents a fabric which may be woven or provided with a series of loops *e*, formed by a thread or threads. This fabric is treated with rubber, preferably in solution, in order to fill the spaces under and around the loops as they project out and away from the body of the fabric *d*. The solution is then allowed to set or solidify. As this increased attaching-surface is desired at the tread only of a tire, the loop fabric in strip form may be applied to the ordinary tire fabrics at this point.

Another method of increasing the contact-surface of a tire fabric is illustrated in Figs. 3 and 4. A sheet of rubber *f*, which may or may not be a special mixture of fibers and rubber, is applied to the tire fabric or an auxiliary strip. The two are then sewed or stitched together, the rows of stitching *h* giving a number of holding-loops or an additional attaching-surface. In connection with or in the place of fibrous-rubber mixture *g* strips of loop-edged or fringed tape *i* or other fibrous material may be sewed on by means of the same stitching *h*, the whole to be covered with rubber before vulcanizing.

The end sought is to provide a number of fibers emanating and extending from a secure and substantial base into the surrounding rubber beyond the plane of the base fabric. When a fibrous-rubber mixture is employed, the subsequent vulcanization of the fibrous rubber and base fabric so strengthens the union of the two that in most cases the stitching together of the parts can be dispensed with. Every fiber vulcanized or otherwise secured to the base fabric and embedded in the rubber materially increases the strength and holding-surface of the parts united.

Fibrous threads are preferable to wire for the reason that the rubber by the process of vulcanization will be made to adhere to and form a stronger union with fibrous material than is possible between metal and rubber. Wire easily separates from and pulls out of rubber in which it has been vulcanized, while fibrous threads adhere and remain firmly embedded.

I am aware that it has been proposed to employ card-teeth in a tire to reduce wearing of the rubber, and I make no claim to such a construction.

I claim as my invention—

1. A pneumatic tire having therein a non-metallic fibrous-rubber mixture vulcanized to a base fabric, substantially as described.

2. A fabric consisting of woven, wound or braided fibrous material and rubber; the said fibrous material having interwoven with, attached thereto, or integral therewith, non-metallic fibers or fibrous threads that extend outward at an angle to the plane of the main fibrous material, into the rubber, for the purpose of binding the rubber mass and fibrous material together in an inseparable union.

3. In a fabric consisting of woven, wound or braided fibrous material and rubber, a means of increasing the contacting surfaces between the two materials by providing the fibrous material with fibers or fibrous threads interwoven therewith, attached thereto or integral therewith, the said fibers extending away from the general plane of the fibrous material and approximately at right angles thereto, the space in between and around these fibers being filled with rubber and the fibers united thereto in addition to the union between the rubber and the general surface of the fibrous material.

4. A fabric composed of an inseparable mass of rubber and non-metallic fibrous material, a portion of the fibrous material extending outward at an obtuse angle to the remainder of said material for the purpose of increasing the connecting-surface of said fibrous material for union with the surrounding rubber.

5. A pneumatic tire having embodied therein a fabric composed of an inseparable mass of rubber and non-metallic fibrous material, a portion of the fibers extending outward at an angle to the plane of the main fibrous material, into the surrounding rubber and vulcanized therein, thereby increasing the contacting surfaces and strengthening the union between the fibrous material and the rubber, substantially as described.

6. A pneumatic tire having incorporated therein flexible non-metallic fibers or fibrous threads secured to a base fabric extending away from and beyond the plane of said fabric, into the surrounding rubber, and vulcanized therein, substantially as described.

PARDON W. TILLINGHAST.

Witnesses:
A. L. BURDICK,
R. J. PHILLIPS.